(12) United States Patent
Teramachi et al.

(10) Patent No.: US 6,312,158 B1
(45) Date of Patent: Nov. 6, 2001

(54) ROLLER GUIDE APPARATUS

(76) Inventors: Hiroshi Teramachi; Mima Teramachi, both of 3-12-30-301, Kamiosaki, Shinagawa-ku, Tokyo (JP)

(*) Notice: Subject to any disclaimer, the term of this patent is extended or adjusted under 35 U.S.C. 154(b) by 0 days.

(21) Appl. No.: 09/481,002

(22) Filed: Jan. 10, 2000

(30) Foreign Application Priority Data

| Jan. 11, 1999 | (JP) | 11-043588 |
| Jan. 11, 1999 | (JP) | 11-043593 |
| Jan. 29, 1999 | (JP) | 11-059162 |
| Apr. 12, 1999 | (JP) | 11-140568 |
| Apr. 30, 1999 | (JP) | 11-161446 |

(51) Int. Cl.$^7$ .................................................. F16C 29/06
(52) U.S. Cl. ............................................. 384/36; 384/44
(58) Field of Search .................................. 384/36, 44, 43, 384/45

(56) References Cited

U.S. PATENT DOCUMENTS 5,273,365 * 12/1993 Kondoh .
5,800,064 * 9/1998 Ohya .

* cited by examiner

Primary Examiner—Lenard A. Footland

(74) Attorney, Agent, or Firm—Brinks Hofer Gilson & Lione

(57) ABSTRACT

A roller guide apparatus comprises: a track rail comprising a rail body extending in a longitudinal direction thereof and having a section in a width direction thereof in shape of circular arc protruding downward in an installed state and a base portion supporting a lower surface of central portion of the rail body in the width direction thereof, the rail body having an upper surface and lower surfaces extended in the width direction from the base portion, the upper and lower surfaces of the rail body having concentric circular arc shapes; a movable block body comprising a block body arranged so as to straddle the rail body and having a lower surface, in an assembled state, opposing to the upper surface of the rail body, a pair of bilateral leg portions extending downward from bilateral end portions of the block body with the track rail being interposed therebetween, a pair of support piece portions extending towards the track rail so as to oppose to the extended portions of the rail body; at least one barrel roller row composed of a number of barrel rollers arranged between the block body of the movable block and the upper surface of the rail body of the track rail to be rollable along the longitudinal direction thereof; and hourglass roller rows, each composed of a number of hourglass rollers, arranged between the lower surfaces of the extended portions of the rail body and the support piece portions of the movable block to be rollable along the longitudinal direction of the rail body.

10 Claims, 17 Drawing Sheets

ROLLER GUIDE APPARATUS

BACKGROUND OF THE INVENTION

The present invention relates to a roller guide apparatus particularly as an aseismatic apparatus for buildings or like structures for guiding a rolling motion thereof.

A rolling guide apparatus utilizing a rolling motion of rolling member has been known as an aseismatic apparatus in prior art. That is, buildings or like structures are supported to be movable with respect to base portions thereof through rolling guide apparatus so as to make it difficult to transfer vibration or the like of the base portion to the building, and in order to support a building having heavy weight or large size, there have been utilized rollers, as rolling members, which have load capacity larger than that of balls.

However, because the roller, which is different from the ball, has no automatic aligning ability, when a degree of parallelization (parallelism) of a track rail and a movable block constituting the guide apparatus is not good, there is a fear that an overload is generated to both bilateral end portions of the roller and, hence, the roller and the track surface are damaged. Even if the roller and the track surface are not damaged, these members are liable to be worn and the durability thereof will be deteriorated. The parallelism of the track rail and the movable block is generally based on performance of mounting surfaces of structures or members to which the track rail and the movable block are mounted. However, with the structure of the building, it is impossible to require for a base portion, as the mounting surface or a mounting portion of a building, to have a high mounting performance as is required for a machine tool or the like.

Incidentally, the rolling guide apparatus as the aseismatic apparatus generally has two types of structure, one utilizing a linear track rail and the other one utilizing a curved track rail in which the track rail is vertically bent so as to follow a locus of a curvilinear motion caused at a time when the building is bent downward. In the former one structure utilizing the linear track rail, kinetic energy of the building which is moved linearly along the linear track rail is absorbed by a damper means, and on the other hand, in the latter one structure utilizing the curved track rail, oscillation energy of the building is converted through the curvilinear motion to potential energy which is then absorbed.

FIG. 17 shows a conventional rolling guide apparatus as an aseismatic apparatus utilizing the curved track rail. The rolling (roller) guide apparatus 501 comprises: a first track rail 504 having a circular track surface and secured on a base (foundation) 502; a first movable block 503 supported to be movable by the first track rail 504 through a roller, not shown; a second movable block 506 operatively coupled on the first movable block 503; a second track rail 505 secured to a building structure 500 so as to be supported by the second movable block 506 through a roller, not shown, to be relatively movable in a direction normal to the first track rail 504; and a inclination absorbing mechanism 507 coupling the first and second movable blocks 503 and 506 so as to absorb the inclination therebetween. As the inclination absorbing mechanism 507, a universal joint or an elastic member has been utilized for absorbing the inclination through elastic deformation thereof.

Such inclination absorbing mechanism is disposed for the following reason.

The building structure 500 is supported by the base 502 through a plurality of rolling (roller) guide apparatus 501 and performs the circular curvilinear motion along the surfaces of the track rails 504 and 505 while maintaining its horizontal attitude. Now, supposing that the first movable block 503 is moved from the lowermost position of the first track rail 504 towards the longitudinal direction thereof, an inclination in the longitudinal direction of the upper surface of the first movable block 503 varies and the second track rail 505 secured to the building structure 500, however, maintains its horizontal attitude. If such condition be maintained, an excessive stress is applied between the second movable block 506 and the second track rail 505, and in such case, these members will be damaged or the first movable block 503 will not move. For these reasons, in the conventional art, the inclination absorbing mechanism 507 is provided between the first and second movable blocks 503 and 506 to obviate such defects.

However, in the case where the elastic member, universal joint or other inclination absorber is utilized for such inclination absorbing mechanism 507, the maximum load to be born (supported) depends on the elastic member, and accordingly, it is difficult to adequately utilize the high load bearing (supporting) ability of the guide apparatus using the roller or roller means.

SUMMARY OF THE INVENTION

An object of the present invention is to substantially eliminate defects or drawbacks encountered in the prior art mentioned above and to provide a roller (rolling) guide apparatus utilizing rollers having a rigidity higher than that of balls and having an automatic aligning performance.

Another object of the present invention is to provide a roller guide apparatus having biaxial guide structure using a curved track rail capable of absorbing an inclination of the apparatus.

These and other objects can be achieved according to the present invention by providing a roller guide apparatus comprising:

a track rail comprising a rail body extending in a longitudinal direction thereof and having a section in a width direction thereof in shape of a circular arc protruding downward in an installed state and a base portion supporting a lower surface of a central portion of the rail body in the width direction thereof, the rail body having an upper surface and lower surfaces extended in the width direction from the base portion, the upper and lower surfaces of the rail body having concentric circular arc shapes;

a movable block body comprising a block body arranged so as to straddle the rail body and having a lower surface, in an assembled state, opposing to the upper surface of the rail body, a pair of bilateral leg portions extending downward from bilateral end portions of the block body with the track rail being interposed therebetween, a pair of support piece portions extending towards the track rail so as to oppose to the extended portions of the rail body;

at least one barrel roller row composed of a number of barrel rollers arranged between the block body of the movable block and the upper surface of the rail body of the track rail to be rollable along the longitudinal direction thereof, and hourglass roller rows, each composed of a number of hourglass rollers, arranged between the lower surfaces of the extended portions of the rail body and the support piece portions of the movable block to be rollable along the longitudinal direction of the rail body.

According to the structure mentioned above, since the barrel rollers and hourglass rollers are used, a linear guide apparatus having a rigidity higher than that of the apparatus using balls can be provided.

Furthermore, since the rail body has a circular section in the width direction thereof, the barrel rollers and the hourglass rollers are slid along the circular shapes of the upper and lower surfaces of the rail body thereby to allow the movable block to perform a circular motion. Accordingly, even if a mounting error exists between the movable block and the track rail, for example, an error in parallelism between objective member mounting surfaces of the movable block and the track rail, the movable block performs a circular motion along the rail body of the track rail thereby to absorb such mounting error. In this circular motion of the movable block, the contacting conditions of the barrel rollers and hourglass rollers to the rail body do not vary. Thus, according to the present invention, there is provided a roller guide apparatus having a high rigidity and improved automatic aligning performance.

Still furthermore, since the barrel rollers and hourglass rollers each has different diameters at its central portion and both axial end portions and has different circumferential length at its axial outer positions, differential sliding is caused at the rolling time, and according to friction resistance due to this differential sliding, the attenuation performance can be attained.

In preferred embodiments of the roller guide apparatus of the structure mentioned above, a plurality of barrel roller rows contacting the upper surface of the rail body are arranged in areas corresponding to the base portion and to the bilateral extended portions. In a modification, a plurality of barrel roller rows contacting the upper surface of the rail body may be arranged in areas corresponding to the bilateral extended portions. According to this structure, an impact load can be absorbed by the elastic deformation of the extended portions of the rail body. In a further modification, the barrel roller row contacting the upper surface of the rail body may be arranged in an area corresponding to the base portion of the track rail. In this structure, it is further preferred to form the apparatus such that at least either one of the barrel rollers and hourglass rollers has a hollow structure along an axial direction thereof so as to absorb a compression load from an upper side through a compression deformation of the barrel rollers and absorb an impact load from a lower side through a flexure deformation of the bilateral extended portions of the rail body.

Still furthermore, according to the present invention, each of the barrel rollers has a radius of curvature of a circular outer configuration of a portion cut along a plane passing a central axis of the barrel roller, the radius of curvature of the barrel roller being slightly smaller than a radius of curvature of the circular upper surface of the rail body.

According to this structure, the central portions of the barrel rollers contact the upper surface of the rail body of the track rail with both the end portions thereof being in a slightly raised state. Therefore, when a light load is applied, a resistance due to the differential sliding is not so large and the movable block can be hence smoothly moved, and when a heavy load is applied, the barrel rollers are compressed and the outer peripheries thereof contact entirely the upper surface of the rail body along the entire longitudinal direction thereof, thus making large the differential sliding and hence increasing the attenuation performance.

For example, it may be preferred to set the radius of curvature of a circular outer configuration of a portion cut along a surface passing a central axis of the barrel roller so as to be in a ratio of 0.95 to 0.99 time of the radius of curvature of the circular upper surface of the rail body. According to such setting, the differential sliding can effectively function.

The present invention includes structures of the curved track rail and the linear track rail. In the curved track rail, the track rail is curved so as to protrude on a side opposite to the movable block.

Still furthermore, according to the present invention, there is provided a roller guide system, particularly as biaxial guide apparatus, comprising first and second roller guide apparatus each having the structure mentioned above, and in such guide system, either one of the first and second roller guide apparatus is arranged upside down so that the track rails of the first and second roller guide apparatus are arranged to be normal to each other and the block bodies of the first and second guide apparatus are mated back to back as an integral structure of one movable block.

In this structure, when the curved track rail is used, curvilinear motion of the movable block along the longitudinal direction of the track rail is guided by the rolling motion of the barrel rollers and the hourglass rollers between one of the track rails and the block body, and the inclination of the other movable block to the other track rail can be absorbed by the sliding motion in the width direction of the barrel rollers and the hourglass rollers of the other block body to the rail body.

As mentioned above, since the barrel roller rows and the hourglass roller rows can achieve not only the rolling guide function but also the inclination absorbing function as it is, so that another separate means such as elastic member or universal joint is not needed to be arranged between the block bodies, thus making the structure simple and extremely improving the maximum load bearing capacity.

The roller guide apparatus or system of the present invention can absorb the biaxial misalignment. In the case where the roller guide apparatus is utilized as an aseismatic apparatus, different from the use for a machine tool, performance of a building structure and/or base structure is not expected. In such case, if the mounting surface is inclined, the inclination can be absorbed by the first and second barrel rollers and hourglass rollers which act as inclination absorbing mechanism such as universal joint, thus achieving the smooth motion regardless of the performance of the mounting surface.

The nature and further characteristic features of the present invention will be made more clear from the following descriptions made with reference to the accompanying drawings.

DESCRIPTION OF THE PREFERRED EMBODIMENTS

Preferred embodiments of the present invention will be described hereunder with reference to FIGS. 1 to 16.

[First Embodiment]

Figure 1:
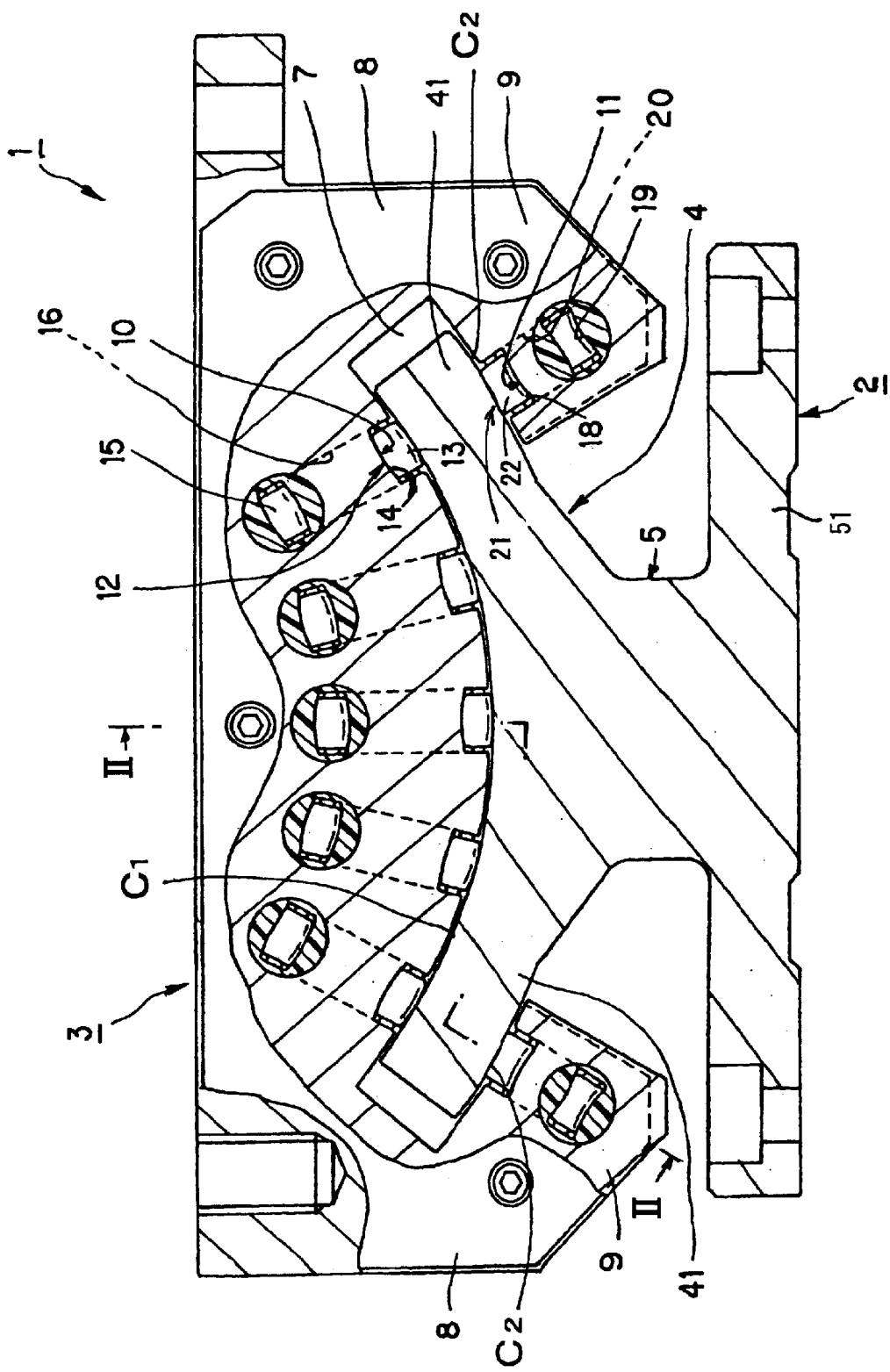
FIG. 1 is an elevational front section showing a roller guide apparatus according to a first embodiment of the present invention.
Figure 2:
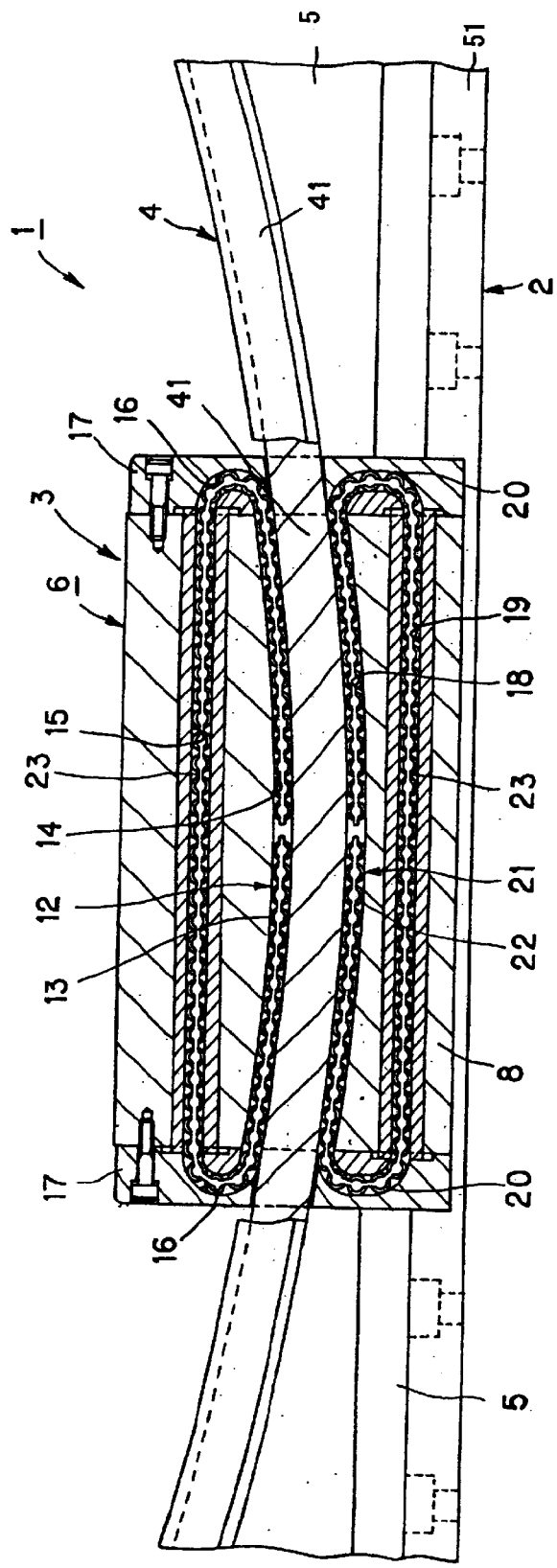
FIG. 2 is a side sectional view, showing a movable block of the rolling guide apparatus of FIG. 1, taken along the line 11—11 therein.
Figure 3:
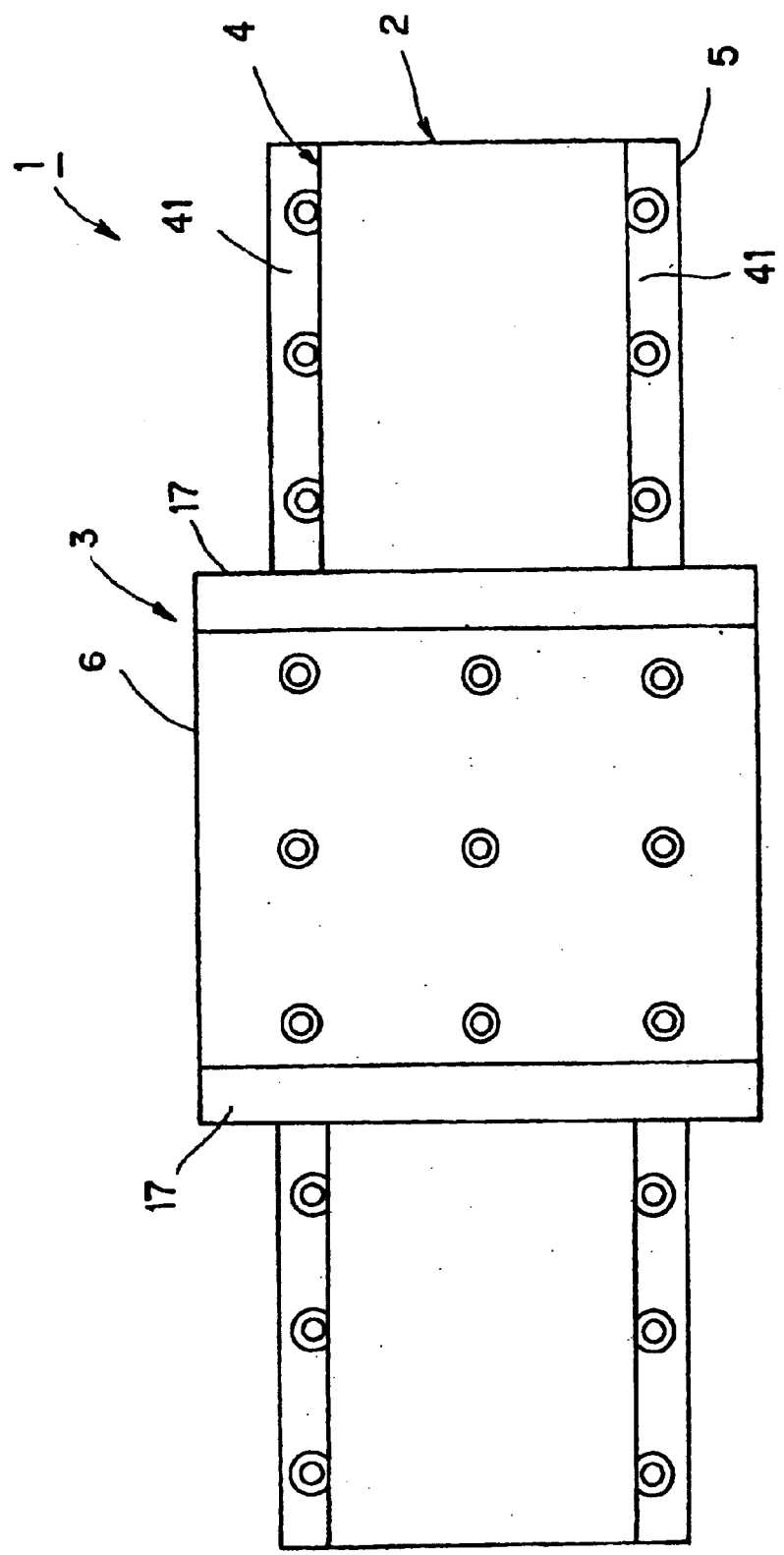
FIG. 3 is a plan view of the rolling guide apparatus of FIG. 1.
Figure 4A:
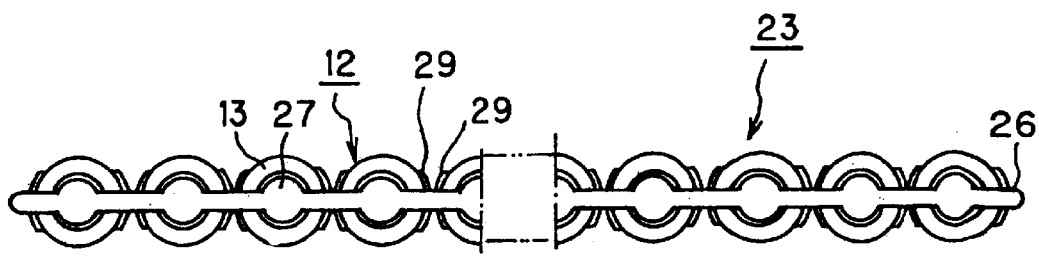
FIG. 4 shows a retainer belt of a barrel-shaped roller of the apparatus of FIG. 1 and includes FIG. 4A being a front view of the retainer belt, FIG. 4B being a plan view thereof, FIG. 4C being a sectional view taken along the line IVC—IVC in FIG. 4B and FIG. 4D being a side view of FIG. 4B.
Figure 4B:
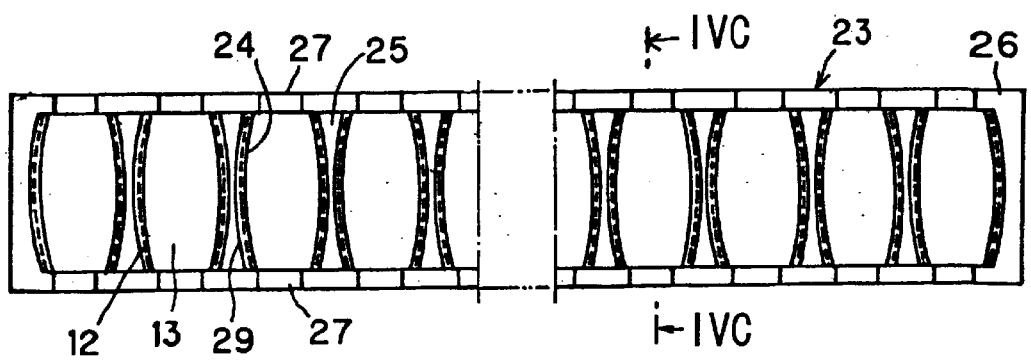
Figure 4C:
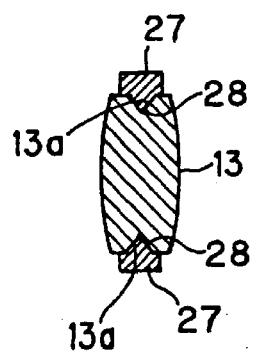
Figure 4D:
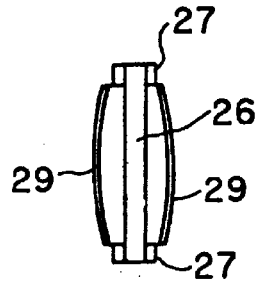
Figure 5A:
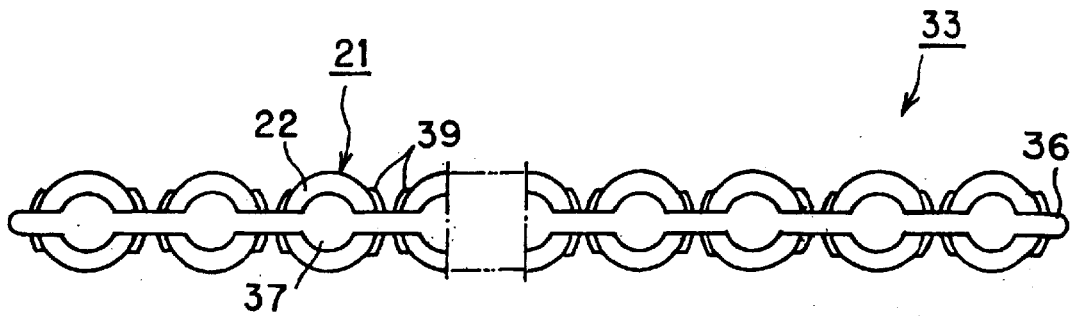
FIG. 5 shows a retainer belt of a hourglass-shaped roller of the apparatus of FIG. 1 and includes FIG. 5A being a front view of the retainer belt, FIG. 5B being a plan view thereof, FIG. 5C being a sectional view taken along the line VC—VC in FIG. 5B and FIG. 5D being a side view of FIG. 5B.
Figure 5B:
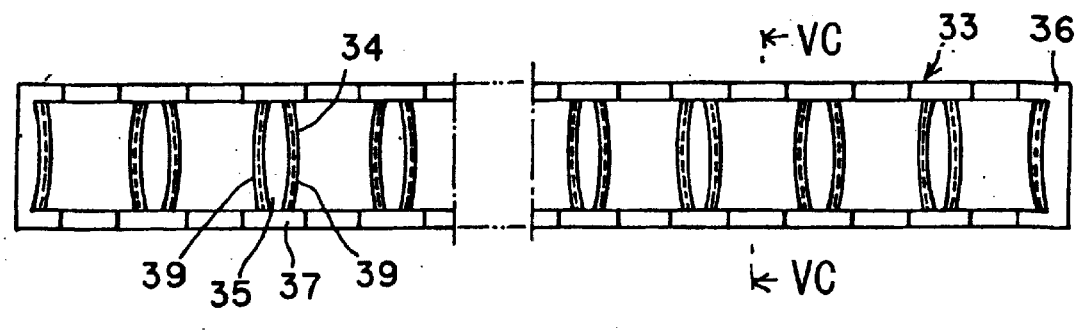
Figure 5C:
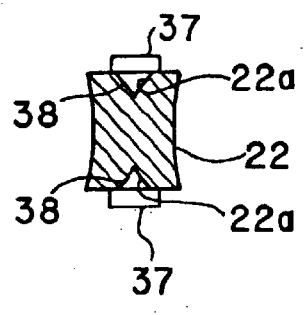
Figure 5D:
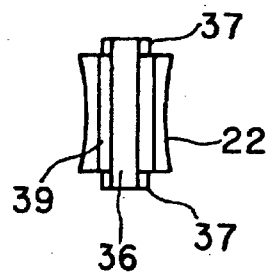

With reference to FIGS. 1 to 3, a linear roller guide apparatus 1 of this first embodiment comprises a track rail 2 and a movable block 3 which is assembled to be movable along the track rail 2.

The track rail 2 comprises a rail body 4 curved so as to project downward, in an installed state as viewed, along the longitudinal direction thereof and a base portion 5 supporting a central lower portion of the rail body 4 in the bilateral (width) direction normal to that longitudinal direction. The rail body 4 has a cross section (width direction) having a circular shape curved downward in a manner that a circular portion C1 of the upper surface of the rail body 4 and a circular portion C2 of lower surface thereof are formed to be concentric to each other with a curvature center 0 being common, the circular portion C2 being formed as bilaterally extended lower surface portions with the base portion 5 being arranged therebetween. The lower end portion of the base portion 5 of the track rail 2 is secured to fixture flanges 51, 51 extending linearly at both sides of the base portion 5.

The movable block 3 comprises a block body 6 facing the upper surface of the rail body 4 when assembled, a pair of leg portions 8, 8 extending downward from both side ends (in width direction) of the block body 6 with predetermined spaces 7 between the leg portions 8, 8 and the rail body 4, and support piece portions 9, 9 projecting inward in the width direction, the support piece portions 9, 9 being formed as hook portions opposing to the lower surface of the bilaterally extended lower surface portions 41, 41 of the rail body 4.

A plurality of rows, five rows in the illustrated embodiment of barrel-shaped rollers (called barrel roller hereinlater) 12 are arranged between the upper surface of the rail body 4 and the block body 6, and a single row of hourglass-shaped rollers (called hourglass roller hereinlater) 21 is arranged between each extended lower surface portion 1 of the rail body 4 and a roller track groove 11 formed to an upper surface of each of the support piece portions 9 of the movable block 3.

The central row of the five rows 12 of the barrel rollers 13 is arranged in an area at the central portion of the rail body 4 corresponding to the position of the base portion 3, and respective two rows of the barrel rollers 13 are symmetrically arranged on the bilateral sides of the central one. Each of the barrel roller rows 12 is constituted by a plurality of barrel rollers 13 tightly arranged in an entire area in a circulation passage formed to the movable block 3.

The circulation passage of each of the barrel roller rows 12 is composed of a roller track groove 10 formed to the lower surface of the block body 6 opposing to the upper circular portion Cl of the rail body 4, a roller escape passage 15 extending linearly and substantially parallel to the roller track groove 10 and U-shaped roller rolling direction changing passages 16 connecting end portions of the roller escape passage 15 and the roller track groove 10 at the respective both ends thereof so as to communicate the roller escape passage 15 with the roller track groove 10, thus forming the roller circulation passage. The (roller rolling) direction changing passages 16 are composed of end plates 17 fixed to both end faces of the block body 6.

The roller track groove 10 has a cross section substantially in a rectangular shape and has an upper bottom portion formed as a roller rolling surface 14 having a circular arc shape having the curvature as that of the circular arc C1 of the upper surface of the rail body 4.

Each of the barrel rollers 13 has an outer peripheral central portion passing the central axis thereof, which is swelled outward, providing a circular shape, and the radius of curvature of this circular arc is substantially equal to or slightly smaller than the radius of curvature of the circular arc C1 of the upper surface of the rail body 4. According to such structure, it is possible to take a large differential sliding and hence to improve an attenuation performance.

More specifically, it is preferred to set the radius of curvature of the configured line of the circular arc shape of the barrel roller 13 which is cut at a surface passing the central axis thereof in a range from about 0.95 to 0.99 time of the radius of curvature of the circular arc section, in the width direction, of the upper surface of the rail body 4. According to such setting of the radius of curvature, the differential sliding can more effectively function.

Furthermore, each of the hourglass roller rows 21 is constituted by a number of hourglass rollers 22 filling the entire area of the circulation passage formed to the movable block 3.

The circulation passage of each of the hourglass roller rows 21 is composed of a roller track groove 11 formed to the upper surface of the supporting piece portion 9 of the block body 6 opposing to the lower circular portion C2 of the extended portion 41 of the rail body 4, a roller escape passage 19 extending linearly substantially in parallel to the roller track groove 11 and U-shaped roller rolling direction changing passages 16 connecting end portions of the roller escape passage 19 and the roller track groove 11 at the respective both ends thereof so as to communicate the roller escape passage 19 with the roller track groove 11, thus forming the roller circulation passage. The (roller rolling) direction changing passages 16 are composed of end plates 17 fixed to both end faces of the block body 6.

The roller track groove 11 of the hourglass roller row 21 has a cross section substantially in a rectangular shape and has a lower bottom portion formed as a roller rolling surface 18 having a circular arc shape protruded upward, as viewed, and having the same curvature as that of the circular arc C2 of the lower surface of the extended portion 41 of the rail body 4.

Each of the hourglass rollers 22 has an outer peripheral central portion passing the central axis thereof, which is recessed inward, providing a circular arc shape, and the radius of curvature of this circular arc is substantially equal to or slightly larger than the radius of curvature of the circular arc C2 of the lower surface of the extended portion 41 of the rail body 4.

As mentioned above, according to this embodiment, the linear motion of the movable block 6 along the longitudinal direction of the track rail 2 is guided through the rollings of the barrel roller rows 12 and the hourglass roller rows 21, and the movable block 6 is made displaceable along the circular arc shape in the width direction of the rail body 4 through the respective sliding motions of the barrel roller rows 12 and the hourglass roller rows 21 along the circular arc C1 of the upper surface of the rail body 4 and the circular arc C2 of the lower surface thereof.

Furthermore, in this embodiment, the barrel roller rows 12 are each supported in series by the flexible roller retainer belt 23. This roller retainer belt 23 is composed of, as shown in FIGS. 4A to 4D, a belt body 26 to which accommodation holes 24, each having substantially a barrel shape into which the barrel roller 13 is accommodated and held, with a predetermined pitch through spacer portions 25 and end face holding plate 27 arranged to longitudinal side edge portions of the belt body 26. The retainer belt 23 is further formed, at the edge portions of the accommodation holes 24, with engaging pieces 29 so as to be engaged with the barrel rollers 13 thereby to hold the same. When each of the barrel rollers 13 is accommodated in the accommodation hole 24, the end face holding plates 27 contact the end faces of the roller 13 to stably hold the axis of the roller 13 in a direction normal to the moving direction of the movable block 6. For this purpose, the end face holding plates 27 are formed with engaging protrusions (projections) 28 which are engaged to be rotatable, with center holes 13a formed to the end faces of the barrel roller 13. The end face holding plates 27 of the retainer belt 23 are guided to the inner wall sections of the roller track groove 10 formed to the block body 6. The center hole 13a is preferably formed as a conical hole having a triangle shape in section.

On the other hand, each of the hourglass roller rows 21 is also supported in series by a flexible roller retainer belt 33. This roller retainer belt 33 is composed of, as shown in FIGS. 5A to 5D, a belt body 36 to which accommodation holes 34, each having substantially a hourglass shape into which the hourglass roller 22 is accommodated and held, with a predetermined pitch through spacer portions 35 and end face holding plate 37 arranged to longitudinal side edge portions of the belt body 36. The retainer belt 33 is further formed, at the edge portions of the accommodation holes 34, with engaging pieces 39 so as to be engaged with the hourglass rollers 22 thereby to hold the same. When each of the hourglass rollers 21 is accommodated in the accommodation hole 34, the end face holding plates 37 contact the end faces of the roller 22 to stably hold the axis of the roller 22 in a direction normal to the moving direction of the movable block 6. For this purpose, the end face holding plates 37 are formed with engaging protrusions (projections) 38 which are engaged, to be rotatable, with center holes 22a formed to the end faces of the hourglass roller 22. The end face holding plates 37 of the retainer belt 33 are guided to the inner wall sections of the roller track groove 11. The center hole 22a is preferably formed as a conical hole having a triangle shape in section.

As mentioned above, according to this first embodiment, since the barrel-shaped rollers 13 and the hourglass-shaped rollers 22 are utilized as rolling members, the contacting area between the rolling members and the track grooves can be made large in comparison with balls utilized as rolling members, thus realizing a sufficient high rigidity with respect to a large or heavy load. In particular, the arrangement of the plural barrel roller rows 12 contacting the upper surface of the rail body 4 can make extremely large a load capacity with respect to a heavy load to be applied from the upper side such as in a case of supporting a building structure.

Furthermore, in general, when the rollers are used as rolling members, the automatic aligning ability or performance is not provided. However, in the present invention, since the rail body 4 is formed so as to provide a circular arc shape, the movable block 3 is moved circularly along the circular arc shape of the rail body 4 thereby to absorb the inclination by sliding the barrel rollers 13 and the hourglass rollers 22 along the circular arc surfaces even the parallelism between the objective member mounting surface of the movable block 3 and the objective member mounting surface of the track rail 3 is not uniform, i.e. irregular, and hence, according to the present invention, a roller guide apparatus having an improved high rigidity and aligning property can be realized.

In the embodiment of the present invention, for example, when a movable block 3A is moved along the longitudinal direction of one of track rails 2, there are applied rolling frictions of the barrel roller rows 12 and the hourglass roller rows 21 and sliding frictions of the barrel roller rows 12 and the hourglass roller rows 21 along the circular arc surfaces in the width direction with respect to the rail body 4. Furthermore, when the movable block 3A is moved along the longitudinal direction of the other one of track rails 2, there are applied rolling frictions of another barrel roller row 12 and hourglass roller row 21 and sliding frictions of one of the barrel roller rows 12 and the hourglass roller rows 21 along the circular arc surfaces in the width direction with respect to another one rail body 4. As mentioned above, in the case where the movable block 3A is moved, not only the rolling frictions of the respective rollers but also the sliding frictions are applied, the vibration attenuation function can be effectively improved.

Figure 6:
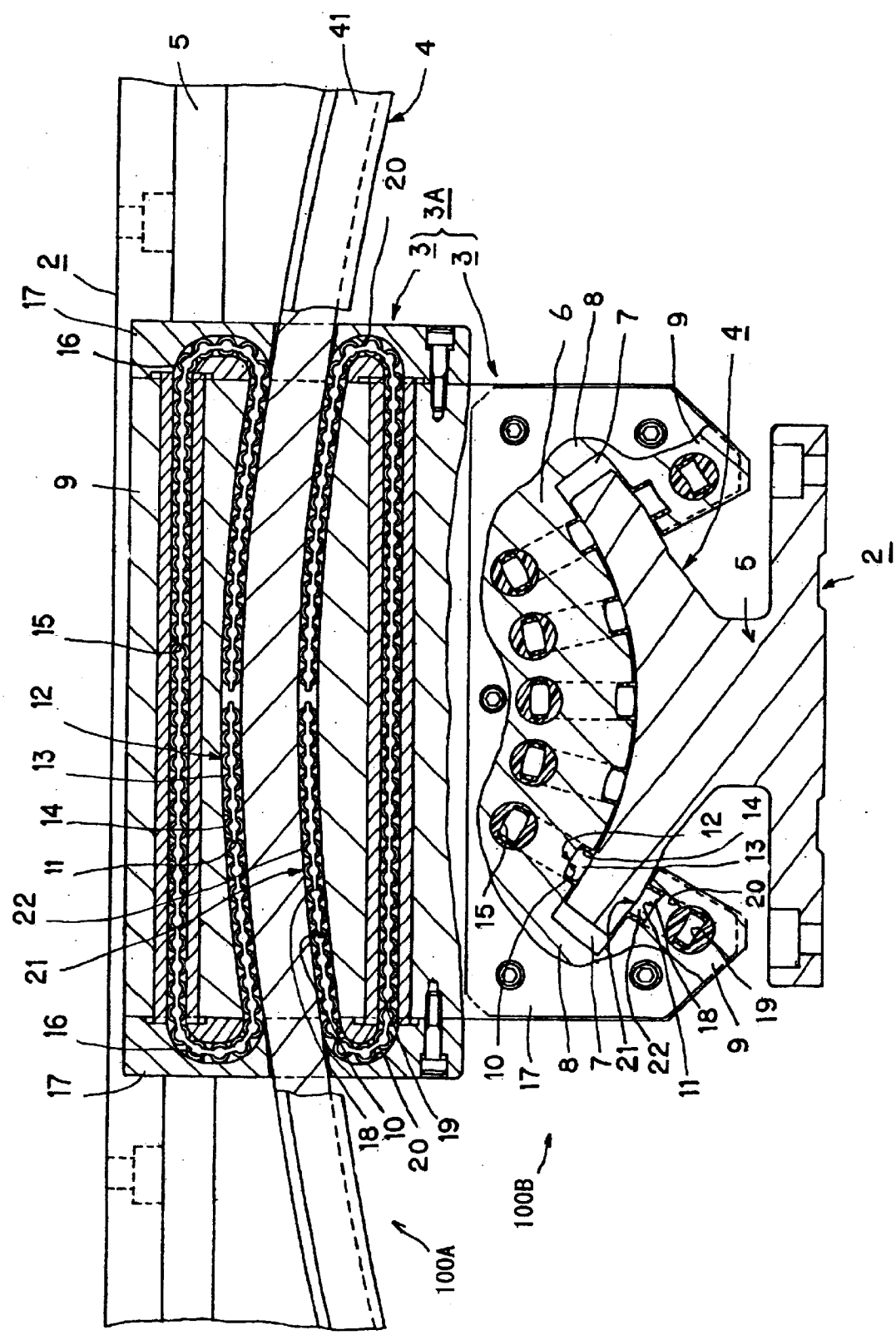
FIG. 6 is a front view, partially broken away, of a biaxial roller guide apparatus assembled by vertically combining the apparatus of FIG. 1.
Figure 7:
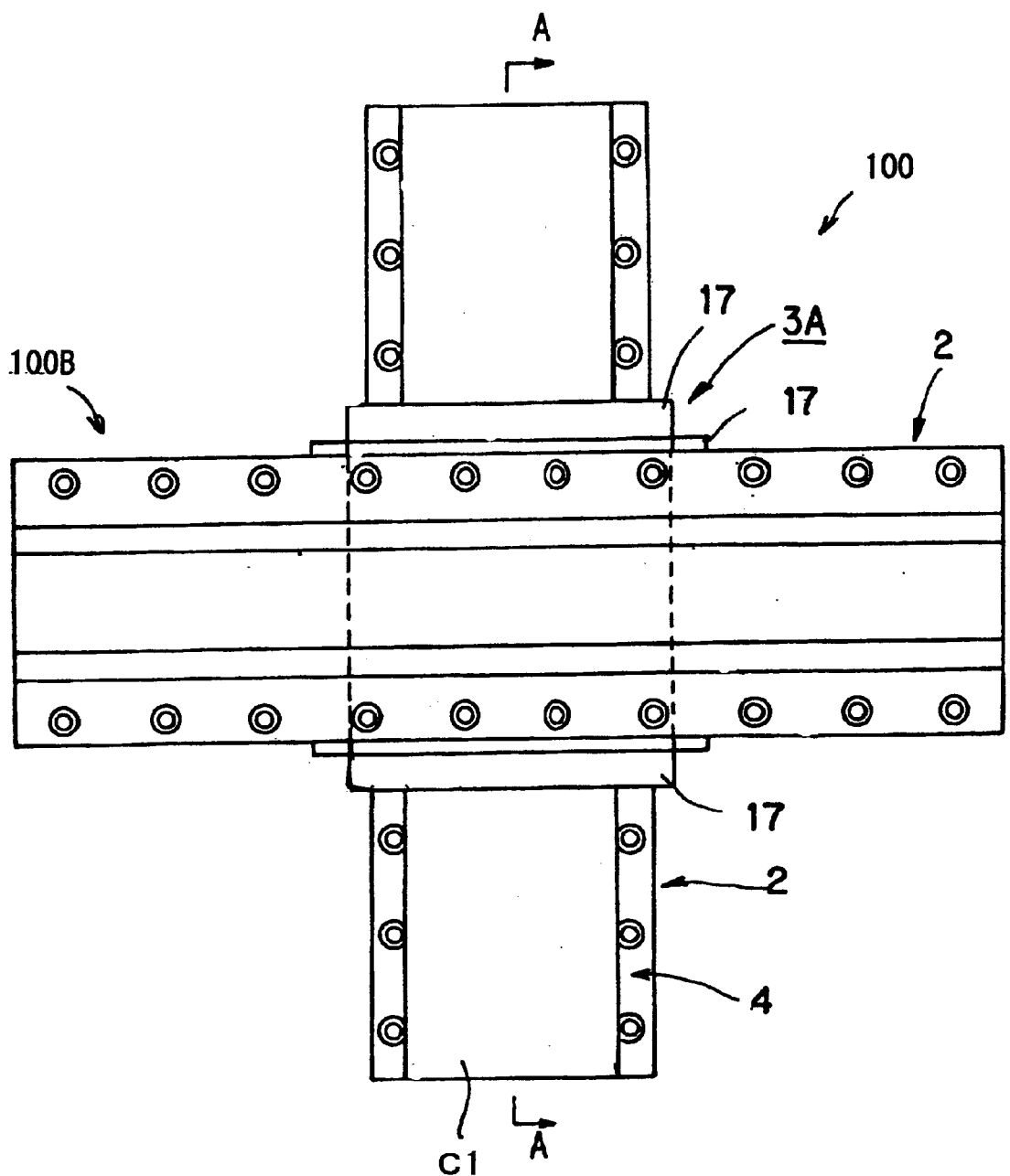
FIG. 7 is a plan view of FIG. 6.

FIGS. 6 and 7 represent a modified embodiment of a biaxial roller guide apparatus utilizing the roller guide apparatus of the first embodiment mentioned hereinbefore.

With reference to FIGS. 6 and 7, the roller guide apparatus 100 of this modified embodiment is composed of two apparatus 1 shown in FIG. 1 in a manner that one roller guide apparatus of FIG. 1 is arranged upside down such that the respective track rails 2, 2 are arranged to be normal to each other and two movable blocks 3, 3 are arranged so that back surfaces thereof are mated to each other, these movable blocks 3, 3 being thus integrated as one movable block 3A. Further, it is to be noted that the term "integrated" (integral) used herein includes cases where independent two movable blocks 3, 3 are integrally fastened by means of bolts, for example, or are formed with one material having no mating (coupling) portion.

That is, the roller guide apparatus 100 is composed of a lower first curved motion guide section 100A and a upper second curved motion guide section 100B which is arranged to be normal to the lower first curved motion guide section 100A for guiding the motion normal to the motion of the lower one. Further, in the embodiment shown in FIGS. 6 and 7, the lower first curved motion guide section 100A has the same structure as that of the roller guide apparatus 1 of the above first embodiment shown in FIG. 1, and the upper second curved motion guide section 100B has basically the same structure of that of the lower first curved guide section 100A and only differs therefrom in its arrangement such that the upper one 100B is arranged upside down and the track rails 2, 2 are arranged to be normal to each other. Therefore, the members or portions of the roller guide apparatus 100 corresponding to those of the apparatus 1 are denoted by the same reference numerals and the detailed explanations thereof are omitted herein.

With this embodiment shown in FIGS. 6 and 7, when the roller guide apparatus 100 is utilized as aseismatic apparatus, one of the track rails 2, 2 is fixed to a base floor, not shown, and the other one thereof is fixed to a building structure. When a vibration or oscillation energy such as in an earthquake is applied, the building structure is moved horizontally along the rail bodies 4, 4 of the first and second guide sections 100A and 100B arranged vertically. However, in this time, since the respective track rails 2, 2 have circular arc shapes which are curved upward and downward, respectively, as the building structure is moved from the lowermost position of the track rails 2, 2 in the vibrating direction, the building structure is raised upward, and hence, the kinetic energy is converted into the potential energy, whereby the movement of the building structure is stopped and the building structure tends to return to the initial position by the gravity. After repeating such pendulum motion, the building structure stops at the lowermost positions of the track rails 2, 2.

In this embodiment, in actual, the building structure is supported by a plurality of such roller guide apparatus 100 with respect to the base floor, and accordingly, the building structure carries out a curved motion along the curved surface in the longitudinal directions of the rail bodies 4, 4 of the respective track rails 2, 2 while maintaining its horizontal attitude.

The motion of one (first) of the track rails 2, 2 of the movable block 3A is guided by the rolling motions of the barrel roller rows 12 and the hourglass roller rows 21 mentioned hereinbefore with reference to the first embodiment of FIG. 1. As the movable block 3A moves along the first track rail 2, the movable block 3A inclines. On the other hand, the track rail 2 fixed to the building structure maintains its horizontal attitude, so that the movable block 3A is inclined to this track rail 2. Such inclination of the movable block 3A can be absorbed by the sliding motion of the barrel roller rows 12 and the hourglass roller rows 21 along the circular arc surfaces in the width direction with respect to the rail body 4.

Further, the vibration energy will be absorbed by the kinetic friction resistance of the respective rollers at the curved motion of the building structure.

In the above embodiments, there are explained the track rails having curved surfaces of the uniaxial (single axis) roller guide apparatus 1 and biaxial (double axes) roller guide apparatus 100. The present invention is, however, further applicable to roller guide apparatus provided with a track rail having a linear surface such as shown in FIG. 8 showing a uniaxial roller guide apparatus 1A and shown in FIG. 9 showing a biaxial roller guide apparatus 200.

Figure 8:
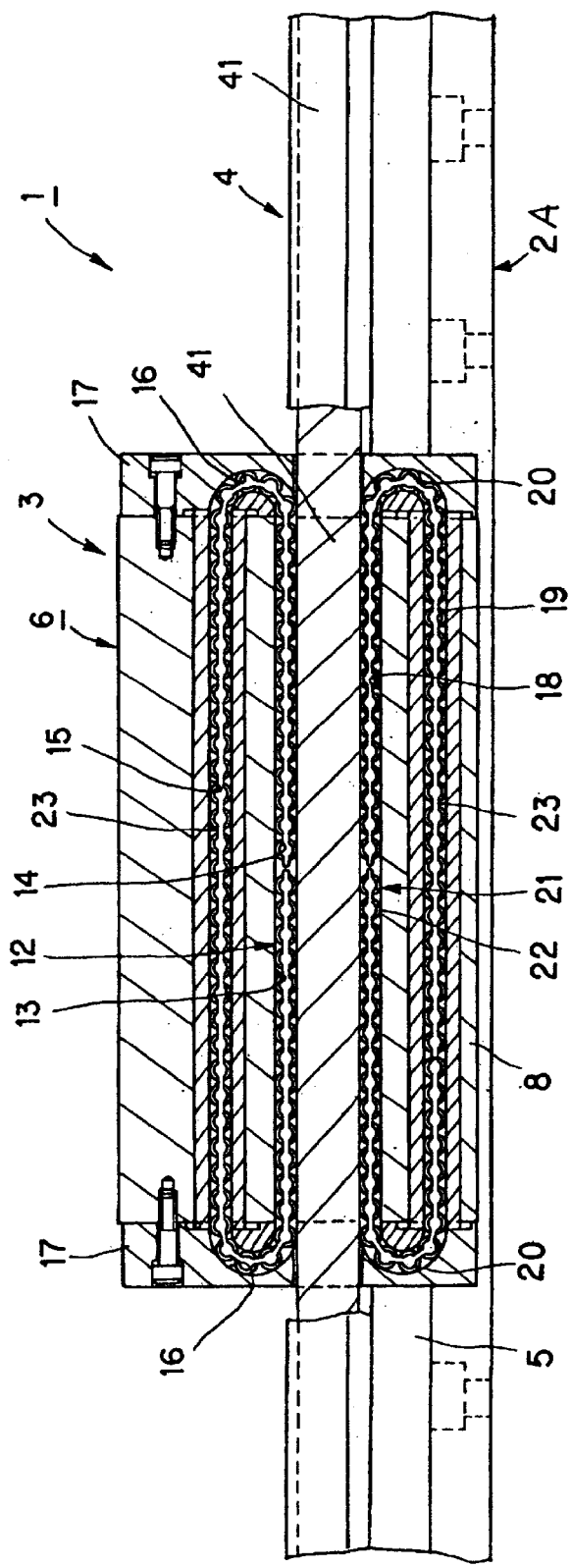
FIG. 8 is a side sectional view corresponding to FIG. 2 in a case where a track rail of the rolling guide apparatus of FIG. 1 is a linear track rail.
Figure 9:
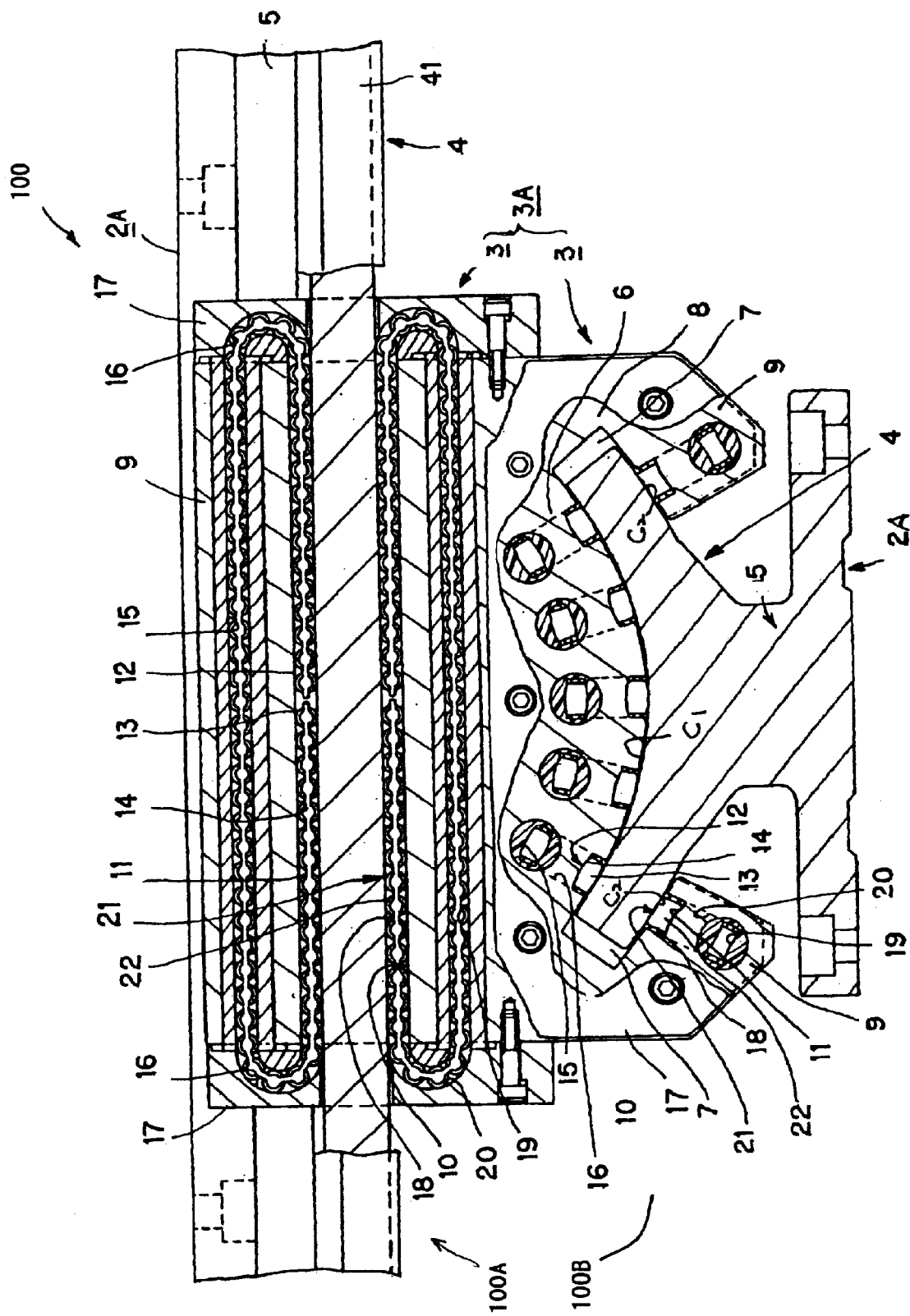
FIG. 9 is a front view, partially broken away, of a biaxial roller guide apparatus assembled by vertically combining the apparatus of FIG. 8.

The embodiments shown in FIGS. 8 and 9 have structures and functions substantially the same as those of the embodiments shown in FIG. 1 and FIG. 9 except that the track rails have linear surfaces, and accordingly, the detailed explanations thereof are omitted herein by adding the same reference numerals as those used in the former embodiments.

Hereunder, other embodiments of the present invention will be described. However, it is to be noted that in explanations of the following embodiments, only differences in structures and/or functions from those of the former embodiments are described, and same reference numerals are added to members or portions corresponding to those in the former embodiments.

[Second Embodiment]

Figure 10A:
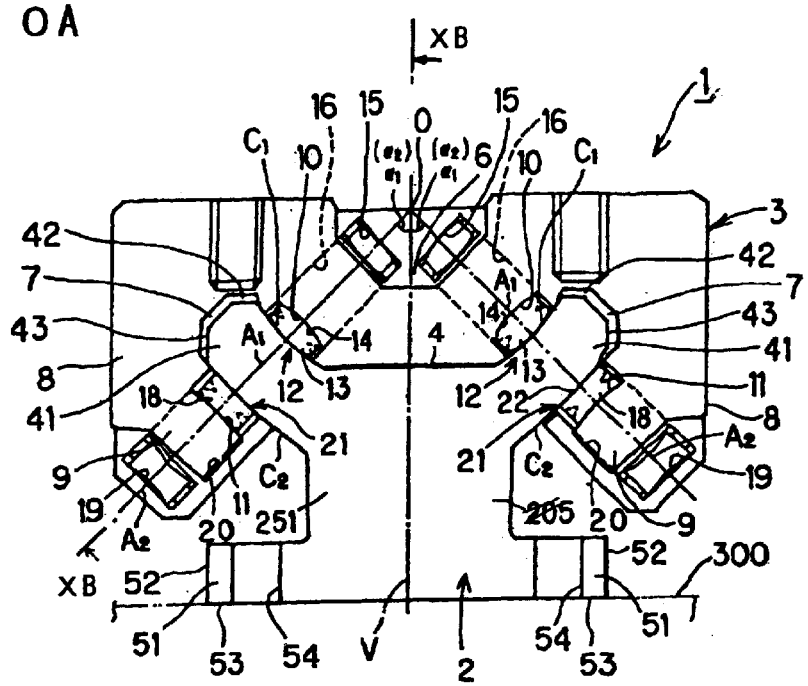
FIG. 10 represents a rolling guide apparatus according to a second embodiment of the present invention and includes FIG. 10A being an elevational front section thereof, FIG. 10B being a sectional side view of a movable block of the apparatus of FIG. 10A taken along the line XB—XB therein and including a curved track rail and FIG. 10C being a view corresponding to FIG. 10B but including a linear track rail.
Figure 10B:
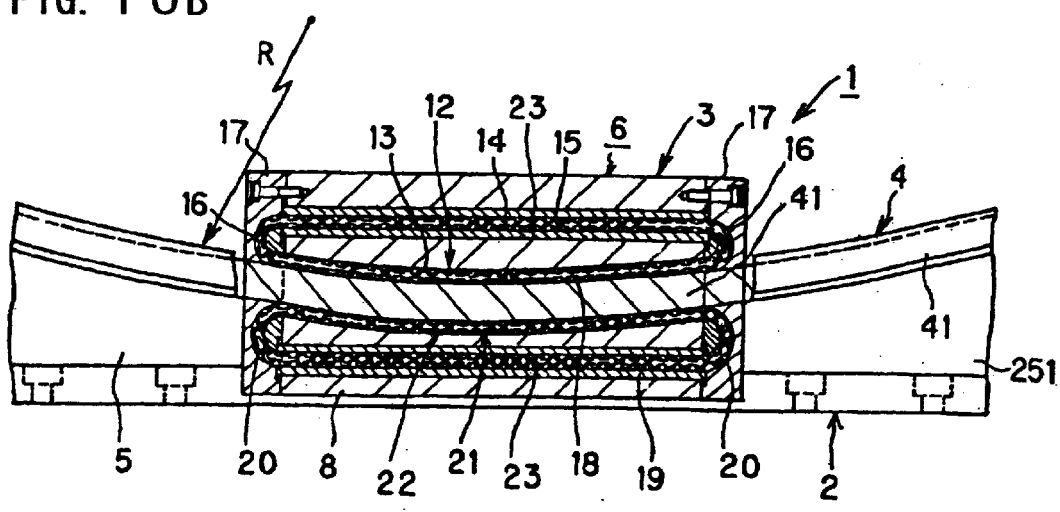
Figure 10C:
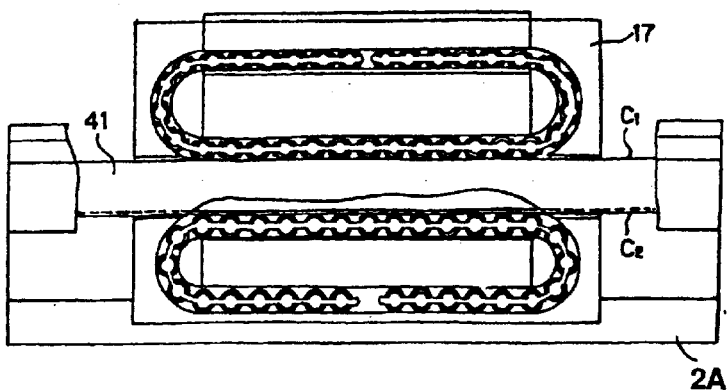
Figure 11:
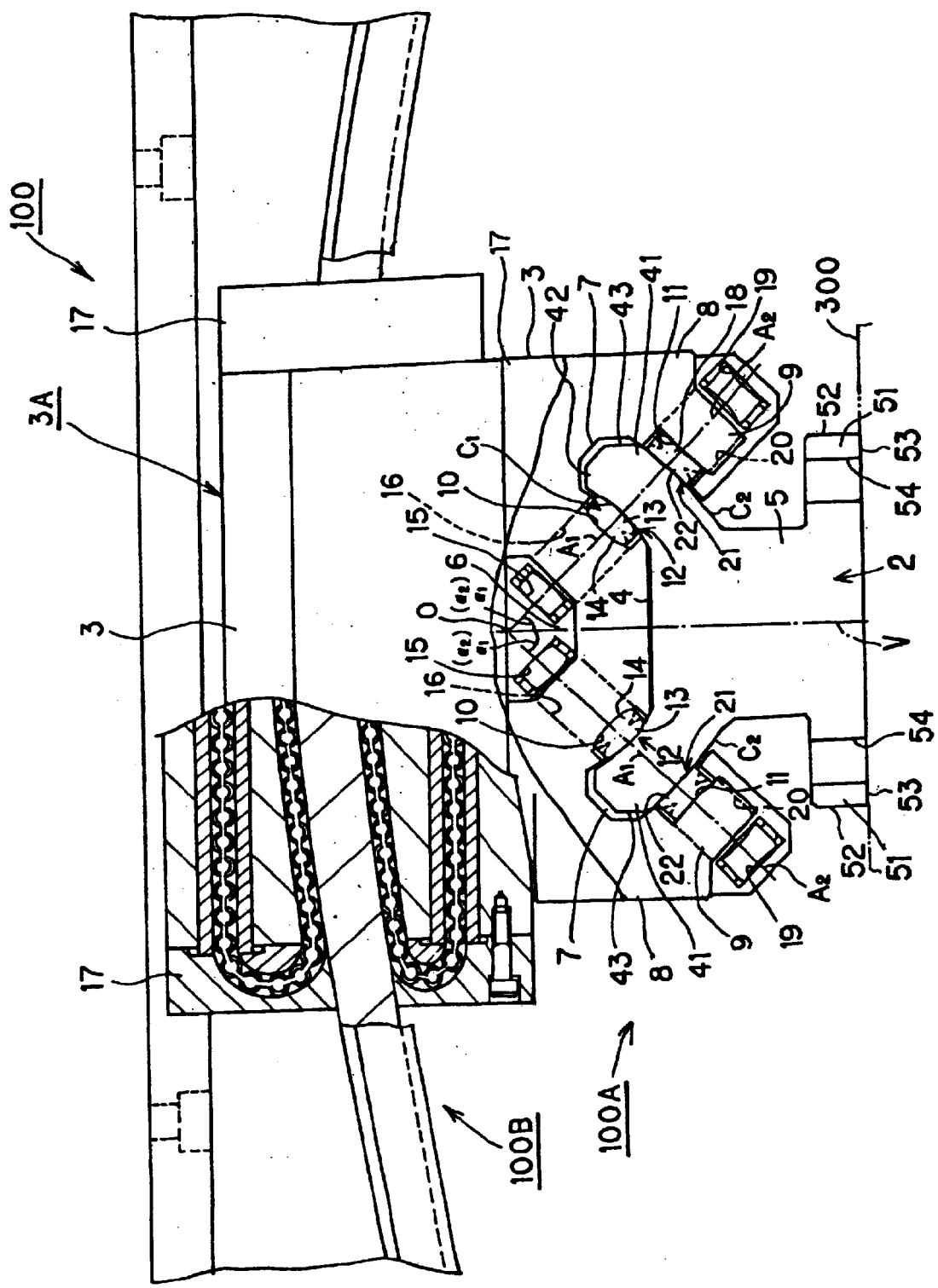
FIG. 11 is a front view, partially broken away, of a biaxial roller guide apparatus assembled by vertically combining the apparatus of FIG. 10 utilizing a curved track rail.
Figure 12:
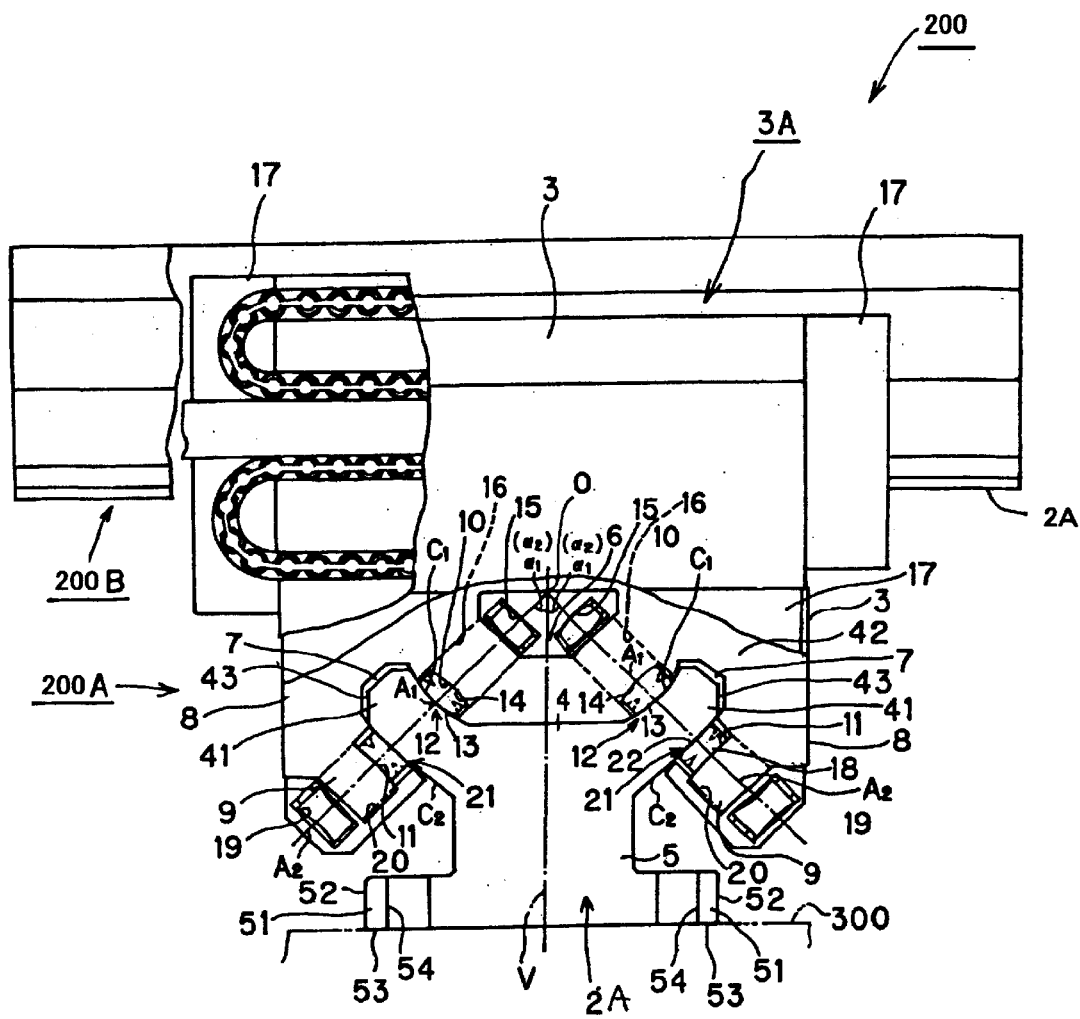
FIG. 12 is a view corresponding to FIG. 11 but utilizing a linear track rail.

FIGS. 10 to 12 represent the second embodiment of the present invention.

With reference to FIG. 10A, in this second embodiment, the barrel roller rows 12, 12 are only arranged on the upper surface portions of the bilateral extended portions 41, 41, i.e. two roller rows in place of five roller rows in the first embodiment, and the hourglass roller rows 21, 21 are arranged at the same portions as that in the first embodiment. That is, the bilateral extended portions 41, 41 of the rail body 4 are clamped by the barrel roller rows 12, 12 and the hourglass roller rows 21, 21, respectively.

According to this arrangement, when an impact load is applied, the bilateral extended portions 41, 41 of the rail body 4 are elastically deformed thereby to absorb the impact load and prevent an excessive stress from being applied to the end portions of the barrel rollers 13 and the hourglass rollers 22, thus being advantageous.

Further, in this embodiment, bilateral upper end portions 42, 42 of the rail body 4 are positioned on a plane parallel to a plane on which bottom surfaces 53, 53 of fixture flanged portions 51, 51 are positioned, and bilateral side end portions 43, 43 of the rail body 4 are also positioned in a plane perpendicular to the plate on which the bottom surfaces 53, 53 of the fixture flanged portions 51, 51 are positioned. In the illustrated embodiment, the bilateral upper end portions 42, 42 of the rail body 4 provide flat surfaces each having a predetermined width, and the bilateral side end portions 43, 43 of the rail body 4 and bilateral end portions 52, 52 of the fixture flanged portions 51, 51 also provide flat surfaces each having a predetermined width.

According to the structure of this embodiment, the sectional shape of the track rail 2 provides a I-shaped section which is composed of a central base portion 5 of the rail body 4, bilateral extended portions 41, 41 extending from the base portion 5 and bilateral extended portions of the fixture flanged portions 51, 51, so that the section modulus is made large and the flexture rigidity in both the vertical and bilateral directions are also increased. Accordingly, a large rigidity can be realized by the structure having the minimum material (mass). Furthermore, by bilaterally extending the fixture flanged portions 51, 51, the stability of the entire structure of the apparatus can be achieved. Still furthermore, at the time of draw-out working, the material is liable to be moved to the upper and lower rail bodies 4 and the fixture flanged portions 51, 51, so that the track rails 2 can be easily worked.

Still furthermore, according to the structure of the present embodiment, the bilateral upper end portions 42, 42 of the rail body 4, the bilateral side end portions 43, 43 of the rail body 4, the bilateral side end portions 52, 52 of the fixture flanged portions 51, 51 and the bottom surfaces 53, 53 of the fixture flanged portions 51, 51 are substantially positioned on lines constituting a rectangular shape formed by connecting these portions, so that the camber (warpage) of the track rail can be amended or sized by positioning both the bilateral end portions 42, 42 of the rail body 4 on the same plane with respect to the upper surface of the track rail 2 and by positioning both the side end portions 43, 43 of the rail body 4 and both the side end portions 52, 52 of the fixture flanged portions 51, 51 are on the same planes, respectively, with respect to the side surfaces of the track rail 2, thus the camber amendment can be easily performed.

Further, in this embodiment, the track rail 2 is fixed to a base floor 300 by means of fastening bolts inserted to bolt holes 54 formed to the flanged portions 51, 51. According to this manner, the fastening working of the track rail 2 to the base floor 300 can be done from the upper side portion of the track rail, thus providing a good workability.

Furthermore, contact angles $\alpha 1$, $\alpha 2$ and of the barrel roller 13 and hourglass roller 22 are set in accordance with conditions in the use of the guide apparatus. These contact angles $\alpha 1$ and $\alpha 2$ means angles constituted by a perpendicular line V passing the center of the rail body 4 and contact angle lines A1 and A2 passing the center of curvature 0 and the axial center portions of the barrel rollers 13 and the hourglass rollers 22 (that is <A1(A1)OV in FIG. 10A, for example).

For example, in a case where it is required to support vertical and horizontal loads in a well balanced state, it will be better, as shown in FIG. 1A, to set the contact angles $\alpha 1$ and $\alpha 2$ of the barrel roller 13 and the hourglass roller 22 to about 45°, and in a case where a large load is applied from the upper portion of the apparatus, it will be better, as shown in FIG. 1B, to set the contact angle $\alpha 1$ of the barrel roller 13 to an angle less than 45°, such as 30°.

In this second embodiment, as like in the first embodiment mentioned hereinbefore, the roller guide apparatus of the present invention may be utilized as a structure utilizing the track rail 2 having a curved surface as shown in FIG. 10B and a structure utilizing the track rail 2A having a linear surface as shown in FIG. 10C.

Furthermore, as modified embodiments, a roller guide apparatus 100 shown in FIG. 11 utilizing a curved track rail 2 provided with an inclination absorbing means may be adopted, and a roller guide apparatus 200 shown in FIG. 12 utilizing a linear track rail 2A may be also adopted.

[Third Embodiment]

FIGS. 13 to 16 represent the third embodiment of the present invention, and in this embodiment, like reference numerals are added to members or portions corresponding to those of the first and/or second embodiments mentioned above.

Figure 13A:
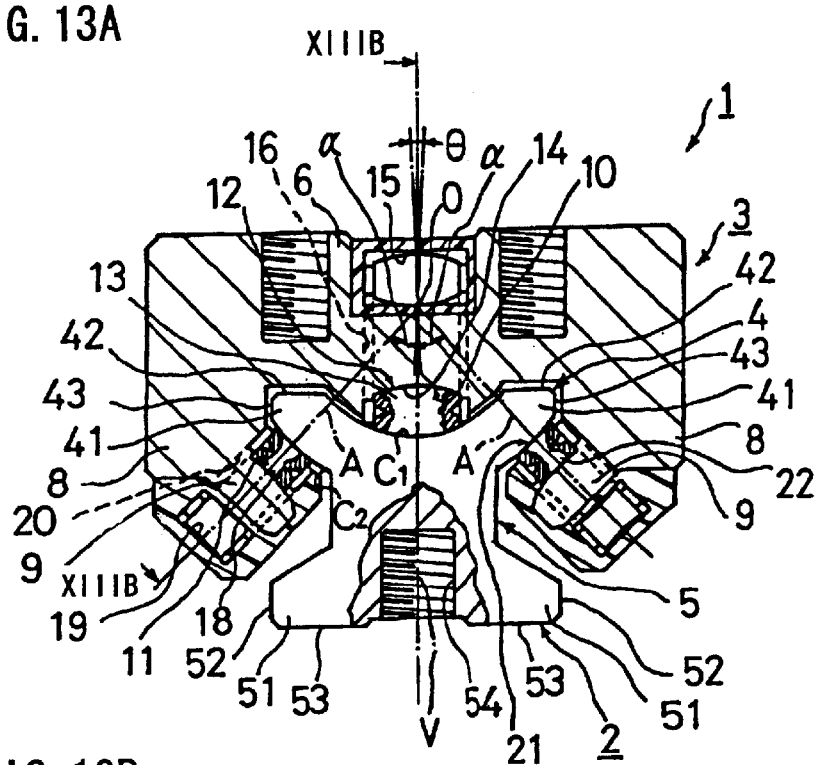
FIG. 13 represents a rolling guide apparatus according to a third embodiment of the present invention and includes FIG. 13A being an elevational front section thereof, FIG. 13B being a sectional side view of a movable block of the apparatus of FIG. 13A taken along the line XIIIB—XIIIB therein and utilizing a curved track rail.
FIG. 13C is a sectional view of a barrel roller along an axial direction thereof.

In this third embodiment, as shown in FIG. 13A, the barrel roller row 12 is arranged only to the portion of the rail body 4 corresponding to the base portion of the track rail 2 and no barrel roller row 12 is arranged to the extended portion 42 of the rail body 4, and two hourglass roller rows 22 are also arranged at portions corresponding to the former embodiment.

Figure 13B:
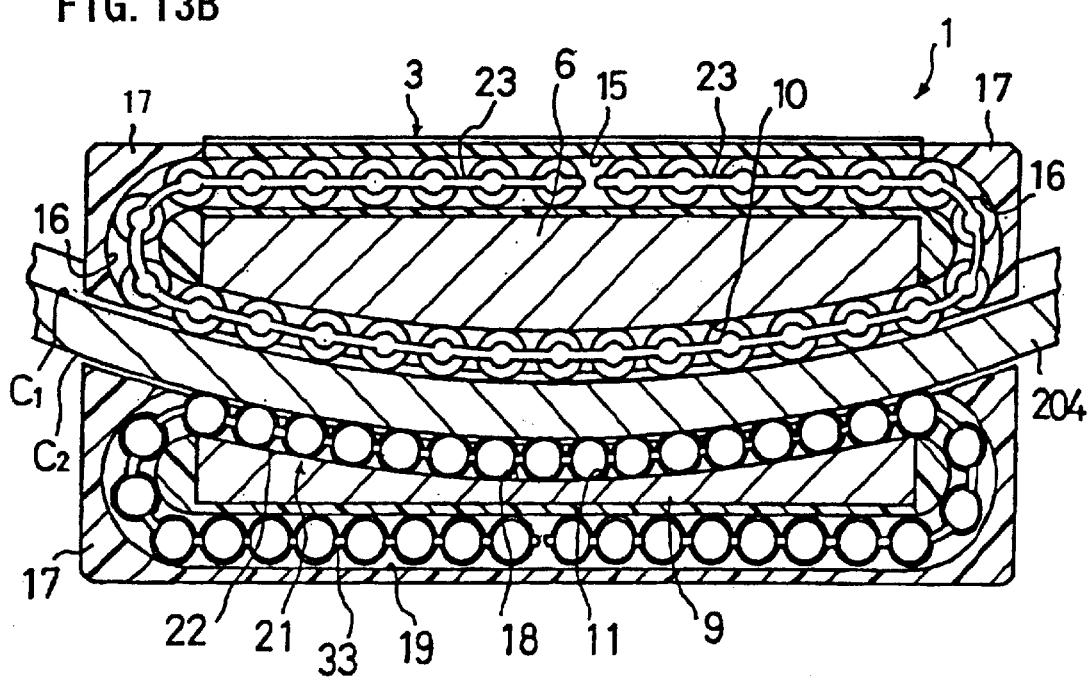
Figure 14:
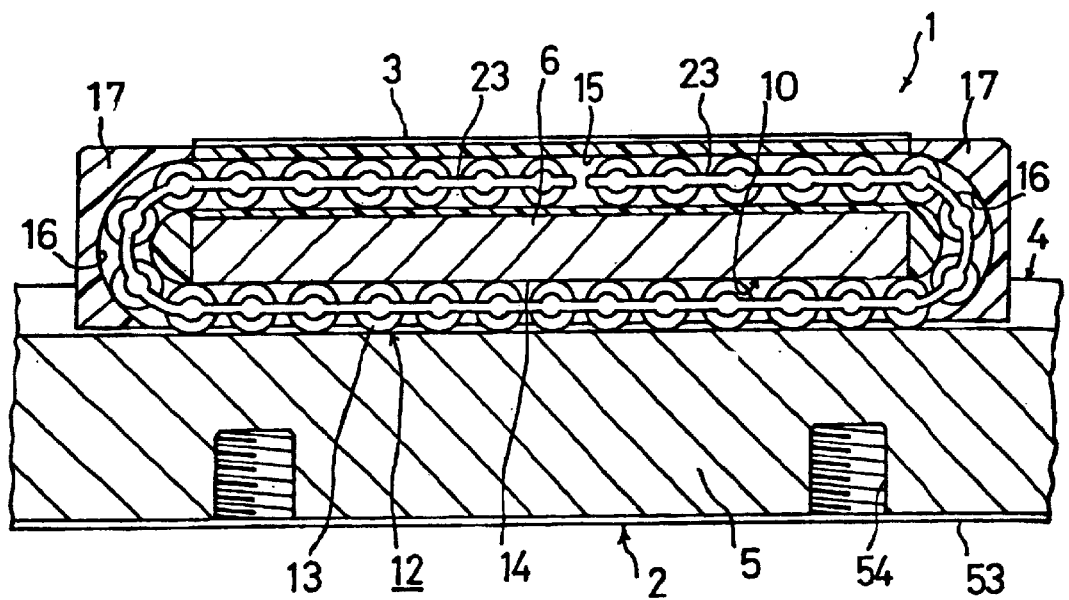
FIG. 14 is a view corresponding to FIG. 13 but utilizing a linear track rail.
Figure 15:
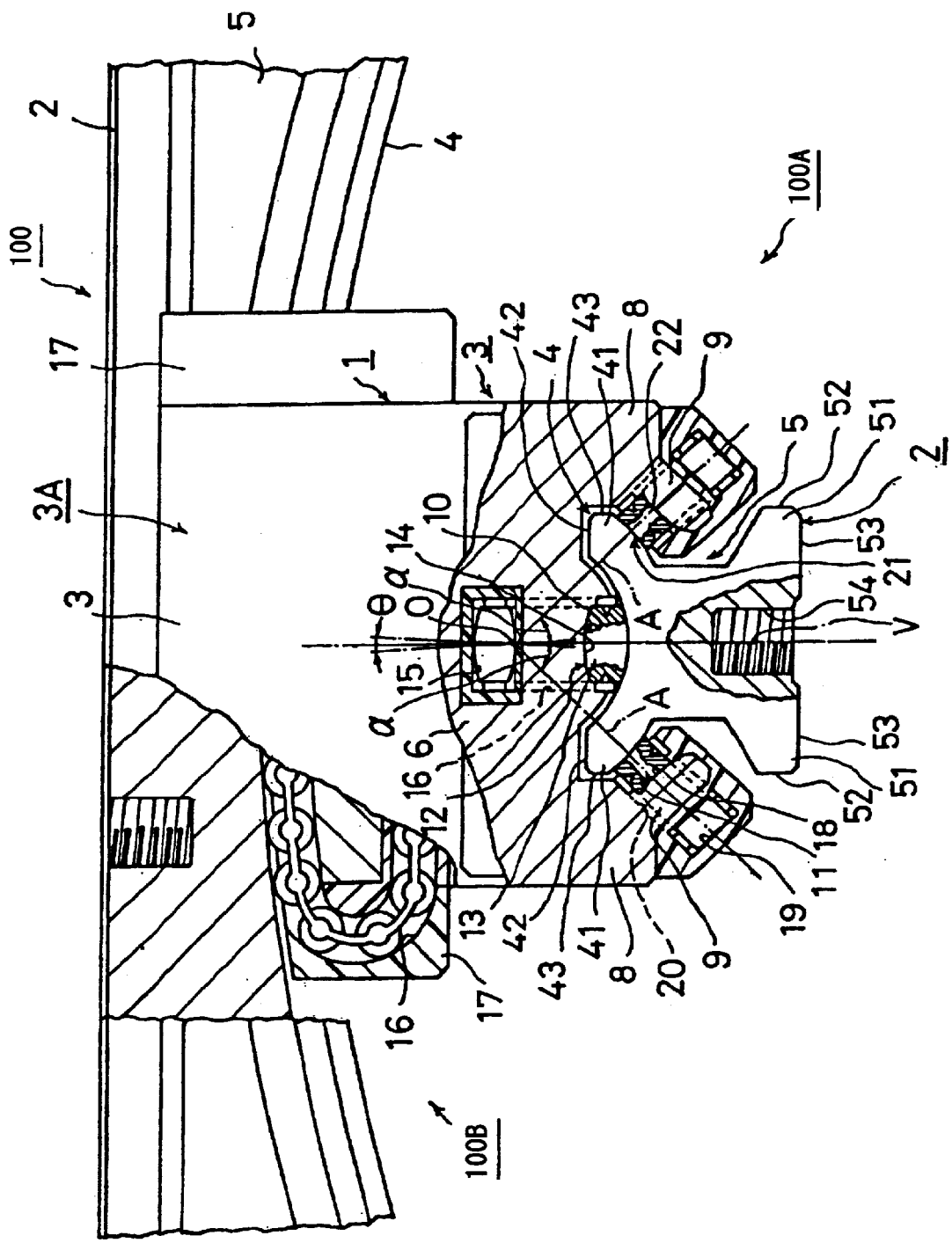
FIG. 15 is a front view, partially broken away, of a biaxial roller guide apparatus assembled by vertically combining the apparatus of FIG. 13 utilizing a curved track rail.
Figure 16:
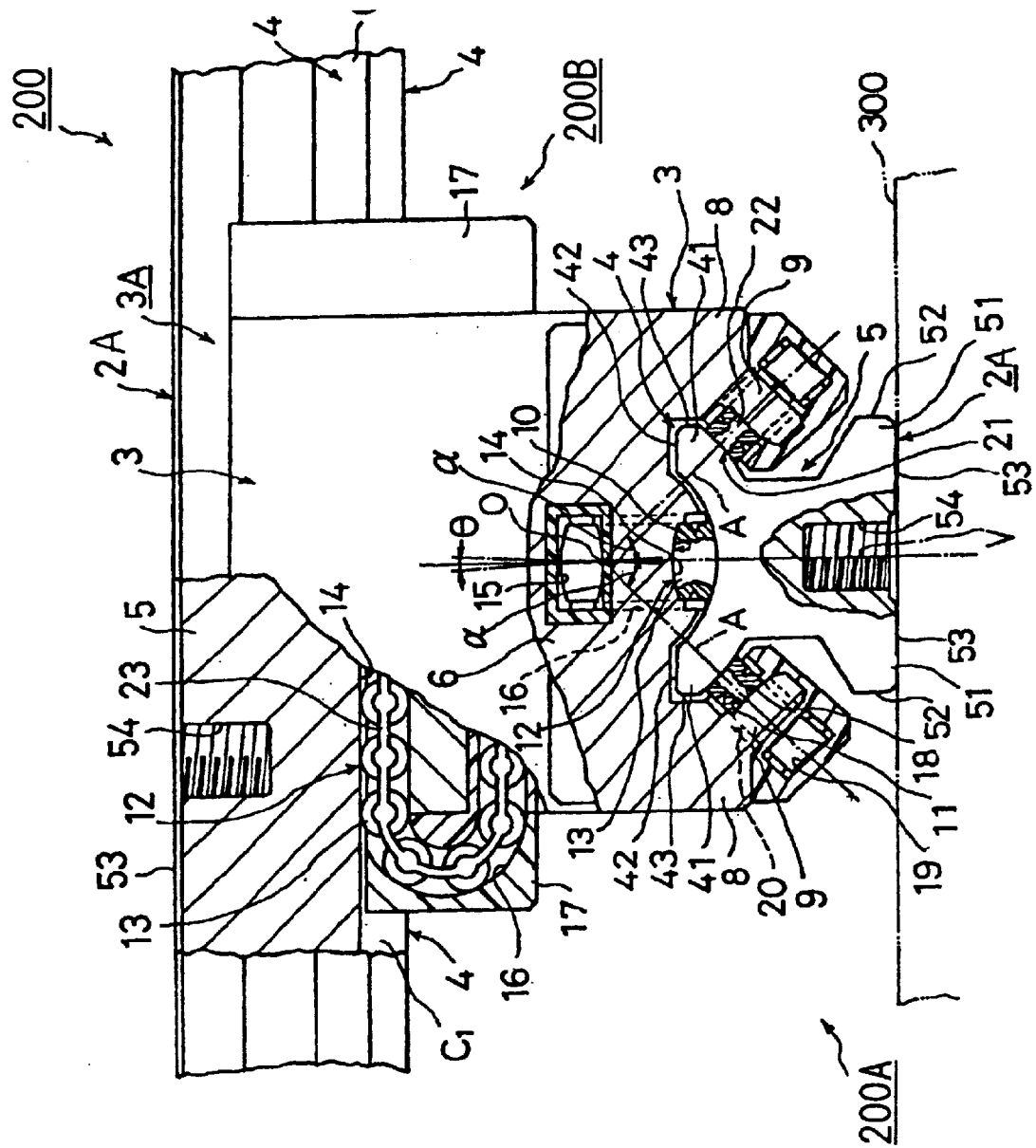
FIG. 16 is a view corresponding to FIG. 15 but utilizing a linear track rail.
Figure 17:
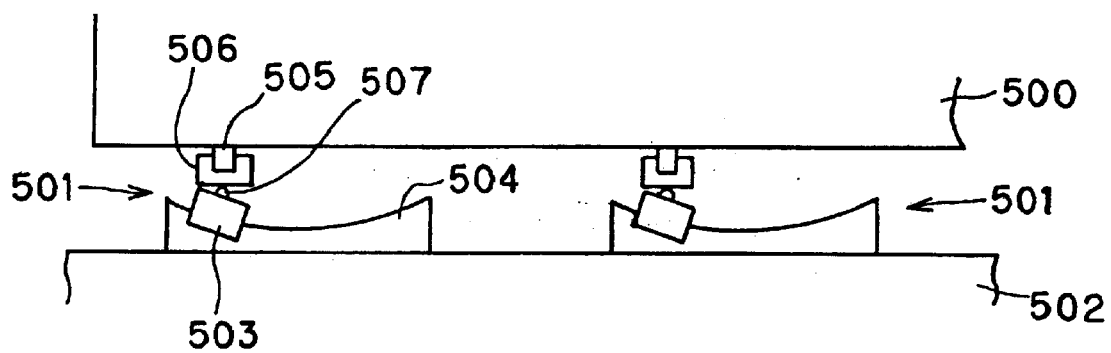
FIG. 17 is a schematic view showing a structure of a conventional biaxial roller guide apparatus provided with an inclination absorbing mechanism.

This embodiment, as in the first embodiment, includes a structure shown in FIG. 13B in which a uniaxial roller guide apparatus is provided with the curved track rail 2 and a structure shown in FIG. 14 in which a biaxial roller guide apparatus is provided with the linear track rail 2A. Furthermore, as modified embodiments, a roller guide apparatus 100 shown in FIG. 15 utilizing a curved track rail 2 provided with an inclination absorbing means may be adopted, and a roller guide apparatus 200 shown in FIG. 16 utilizing a linear track rail 2A may be also adopted.

Figure 13C:
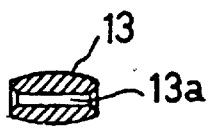

Furthermore, in this embodiment, as shown in FIG. 13C, at least the barrel roller 13 may have a structure of a pipe shape having an inner axial hollow portion. According to such hollow structure of the barrel roller 13, compression load from the upper side can be absorbed by compression deformation of the barrel rollers 13, and on the other hand, impact load from the lower side can be absorbed by flexture deformation of the bilateral extended portions 41, 41 of the rail body 4. Although not shown, it is of course possible to further absorb the impact load from the lower side by forming the hourglass rollers so as to also provide a hollow shape. According to such structure, it is prevented to apply an excessive load to a portion to which barrel rollers 13 and hourglass rollers 22 are contacted, such as an engine unit.

Still furthermore, in this embodiment, a supporting rigidity can be made further large by setting longer the length of the upper one barrel roller row 12. For example, it may be possible to provide a four-direction equal load supporting structure even by the arrangement of the upper one roller row and the lower two roller rows, in which the length of the barrel roller row 12 contacting the upper surface of the rail body 4 is made about twice the length of each of two hourglass roller rows 22 contacting the lower surface thereof. A roller guide apparatus of such uniaxial guide structure is suitably applicable as a roller guide apparatus for a machine tool.

Particularly, as described with reference to the first embodiment, by setting the radius of curvature of the circular outer configuration line cut at a plane passing the central axis of each of the barrel rollers 13 to a value slightly smaller than the radius of curvature of the circular section in the width direction of the upper surface of the rail body 4, the central portion of the barrel roller 13 contacts the upper surface of the rail body 4, and both the end portions thereof are slightly raised. Accordingly, at a time when a light load is applied, a resistance due to the differential sliding is not so large and the rollers are hence smoothly moved, and at a time when a heavy load is applied such as in a cutting working time, the barrel rollers 13 are compressed and both the end portions thereof are also contacted to the upper surface of the rail body 4 in the entire longitudinal direction, so that the differential sliding is made large, thus increasing the attenuation performance.

Furthermore, since the sectional shape of the rail body 4 in the width direction provides a circular arc shape, the barrel rollers 13 and the hourglass rollers 22 are slid along the upper surface and the lower circular surface of the rail body 4, and the movable block 3 is circularly movable by a predetermined angle $\alpha$ about the curvature center 0 of the rail body 4. Accordingly, even in a case where there is a mounting error between the movable block 3 and the track rail 2, for example, an error in parallelism between the objective mounting surfaces of the movable block 3 and the track rail 2, the movable block 3 can be moved circularly along the rail body 4 in accordance with such mounting error thereby to absorb such mounting error. Moreover, even if the movable block 3 is circularly moved, the contacting conditions of the barrel rollers 13 and the hourglass rollers 22 with respect to the circular surface of the rail body 4 do not vary.

It is to be noted that the present invention is not limited to the described embodiments and many other changes and modifications may be made without departing from the scopes of the appended claims.

What is claimed is:

1. A roller guide apparatus comprising:

a track rail comprising a rail body extending in a longitudinal direction thereof and having a section in a width direction thereof in shape of a circular arc protruding downward in an installed state and a base portion supporting a lower surface of central portion of the rail body in the width direction thereof, said rail body having an upper surface and lower surfaces extended in the width direction from the base portion, said upper and lower surfaces of the rail body having concentric circular arc shapes;

a movable block body comprising a block body arranged so as to straddle the rail body and having a lower surface, in an assembled state, opposing to the upper surface of the rail body, a pair of bilateral leg portions extending downward from bilateral end portions of the block body with the track rail being interposed therebetween, a pair of support piece portions extending towards the track rail so as to oppose to the extended portions of the rail body;

at least one barrel roller row composed of a number of barrel rollers arranged between the block body of the movable block and the upper surface of the rail body of the track rail to be rollable along the longitudinal direction thereof; and hourglass roller rows, each composed of a number of hourglass rollers, arranged between the lower surfaces of the extended portions of the rail body and the support piece portions of the movable block to be rollable along the longitudinal direction of the rail body.

2. A roller guide apparatus according to claim 1, wherein a plurality of barrel roller rows contacting the upper surface of the rail body are arranged in areas corresponding to the base portion and to the bilateral extended portions.

3. A roller guide apparatus according to claim 1, wherein a plurality of barrel roller rows contacting the upper surface of the rail body are arranged in areas corresponding to the bilateral extended portions.

4. A roller guide apparatus according to claim 1, wherein said barrel roller row contacting the upper surface of the rail body is arranged in an area corresponding to the base portion of the track rail.

5. A roller guide apparatus according to claim 4, wherein at least either one of the barrel rollers and hourglass rollers has a hollow structure along an axial direction thereof so as to absorb a compression load from an upper side through a compression deformation of the barrel rollers and absorb an impact load from a lower side through a flexure deformation of the bilateral extended portions of the rail body.

6. A roller guide apparatus according to claim 1, wherein each of said barrel rollers has a radius of curvature of a circular outer configuration of a portion cut along a plane passing a central axis of the barrel roller, said radius of curvature of the barrel roller being smaller than a radius of curvature of the circular upper surface of the rail body.

7. A roller guide apparatus according to claim 1, wherein said track rail extends along the longitudinal direction thereof and is a curved rail protruded in a direction opposing to the movable block.

8. A roller guide system comprising first and second roller guide apparatus of a structure each defined in claim 7, wherein either one of the first and second roller guide apparatus is arranged upside down so that the track rails of the first and second roller guide apparatus are arranged to be normal to each other and the block bodies of the first and second guide apparatus are mated back to back as an integral structure of one movable block.

9. A roller guide apparatus according to claim 1, wherein said track rail is a linear rail extending linearly along the longitudinal direction thereof.

10. A roller guide system comprising first and second roller guide apparatus of the structure each defined in claim 9, wherein a first wherein either one of the first and second roller guide apparatus is arranged upside down so that the track rails of the first and second roller guide apparatus are arranged to be normal to each other and the block bodies of the first and second guide apparatus are mated back to back as an integral structure of one movable block.

* * * * *

UNITED STATES PATENT AND TRADEMARK OFFICE
CERTIFICATE OF CORRECTION

PATENT NO. : 6,312,158 B1 Page 1 of 1
DATED : November 6, 2001
INVENTOR(S) : Hiroshi Teramachi et al.

It is certified that error appears in the above-identified patent and that said Letters Patent is hereby corrected as shown below:

Column 14,
Line 38, after "9," delete "wherein a first".

Signed and Sealed this

First Day of October, 2002

Attest:

Attesting Officer

JAMES E. ROGAN
Director of the United States Patent and Trademark Office